March 27, 1928.
V. LINK
1,663,803
CLUTCH CONSTRUCTION
Filed Nov. 1, 1926
2 Sheets-Sheet 1
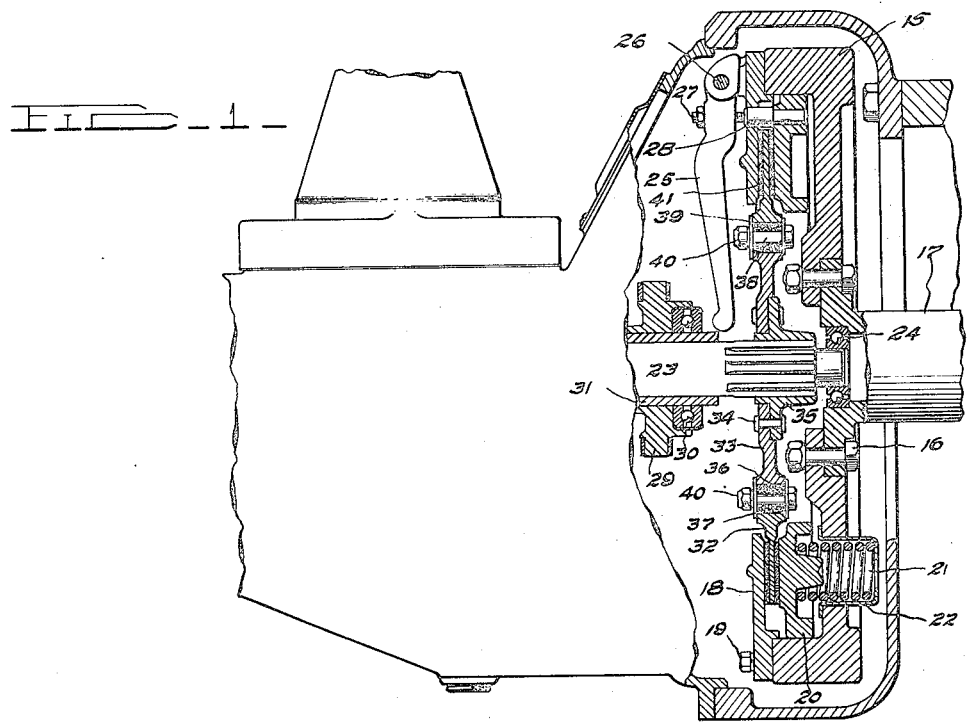
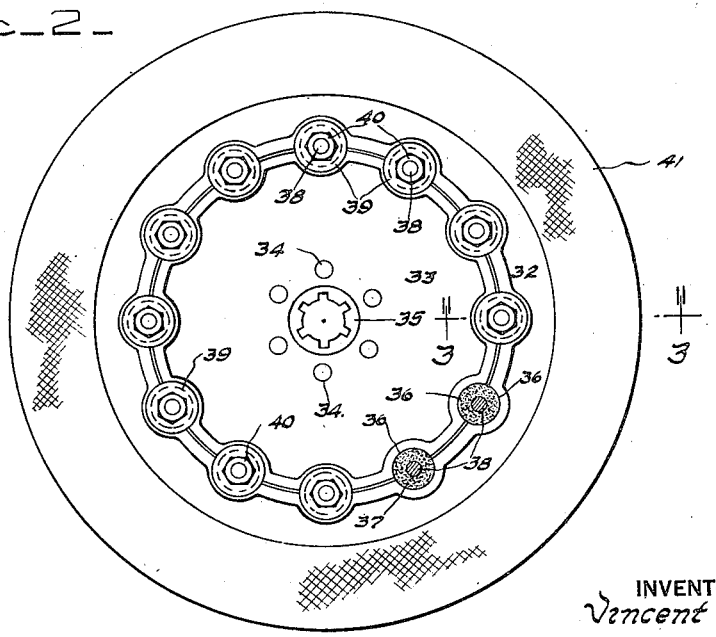
INVENTOR
Vincent Link
BY
ATTORNEY

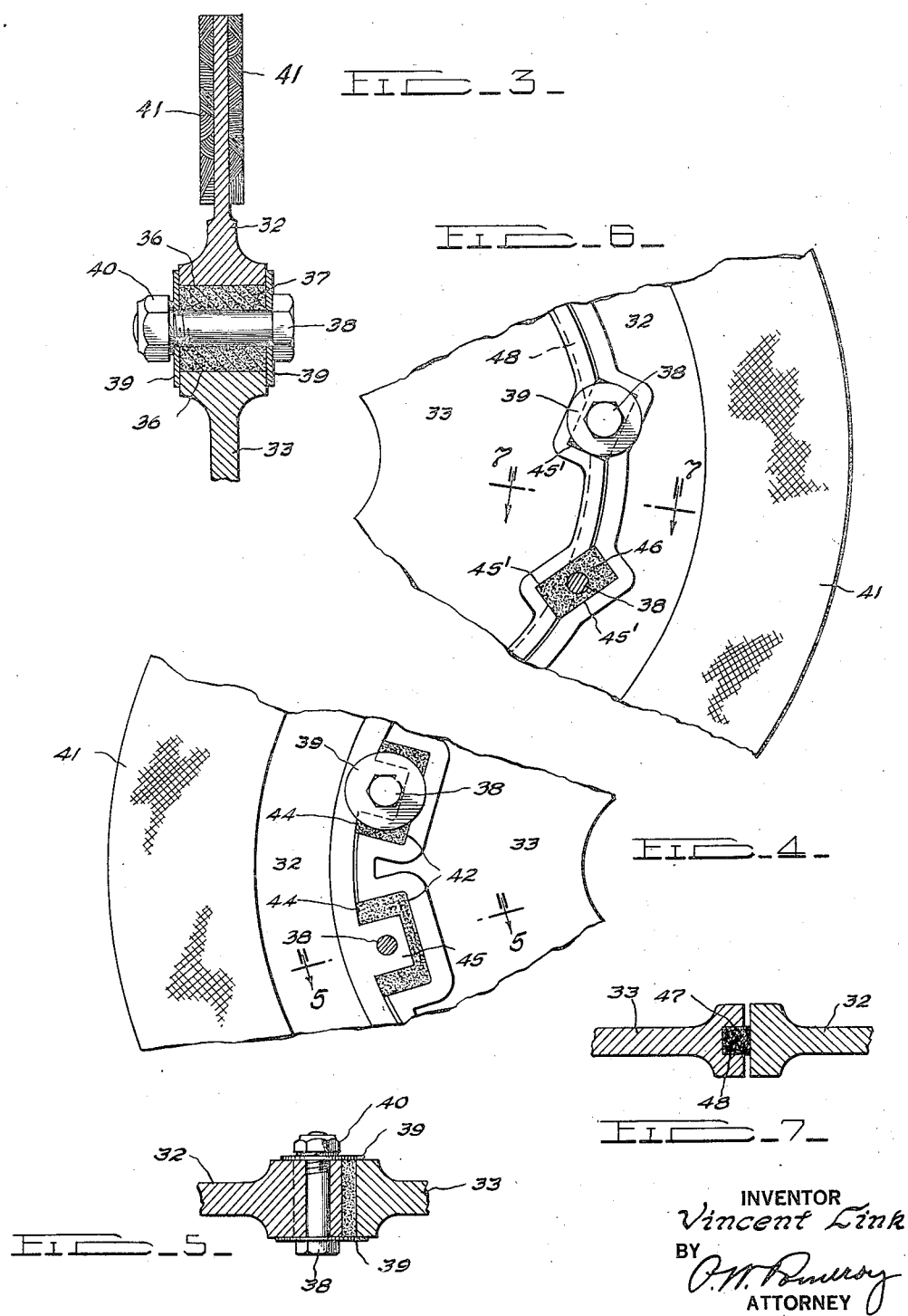

Patented Mar. 27, 1928.

1,663,803

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

CLUTCH CONSTRUCTION.

Application filed November 1, 1926. Serial No. 145,500.

This invention relates to clutches for motor vehicles and particularly to the construction of the driven member thereof, the principal object being to provide such member with yieldable means whereby torsional oscillations from the crank shaft will be dampened before reaching the clutch driven shaft.

Another object is to provide a clutch driven member having a main outer portion and a hub portion, and means whereby the outer portion thereof is yieldably connected to the hub portion.

Another object is to provide a clutch driven member having a main outer portion and a hub portion in which the driving force transmitted to the outer portion thereof is in turn transmitted to the hub through rubber blocks.

Another object is to provide a clutch driven member circular in shape and comprising two main portions having adjacent surfaces lying in a generally circular path, means being provided in such path for receiving resilient blocks whereby said portions are yieldably connected together for limited movement in a circumferential direction relative to each other.

A further object is to provide a clutch driven member comprising a main outer portion and a main inner portion, the portions being provided with adjacent surfaces lying in a generally circular path and provided with means lying substantially in said path for yieldably connecting said portions together and for holding said adjacent surfaces out of contact with each other.

The above being among the objects of the present invention, the same consists of certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views.

Figure 1 is a partially broken fragmentary view of a clutch and transmission unit for a motor vehicle, part of the clutch housing being broken away to expose the clutch which is shown in vertical section.

Figure 2 is a rear face view of the driven member of the clutch shown in Figure 1.

Figure 3 is a fragmentary sectional view taken on the line 3—3 of Figure 2.

Figure 4 is a fragmentary face view of a modified clutch driven member construction.

Figure 5 is a fragmentary sectional view taken on the line 5—5 of Figure 4.

Figure 6 is a fragmentary face view of another modified clutch driven member construction.

Figure 7 is a fragmentary sectional view taken on the line 7—7 of Figure 6.

In internal combustion engines, particularly those of the type used in motor vehicles, at certain speeds the frequency of explosions of the combustible mixture in the cylinders comes in phase with the natural period of torsional vibration of the engine crank shaft and produces a torsional oscillation of the crank shaft. At the flywheel end of the engine the flywheel tends to prevent such end of the crank shaft from being affected by such oscillations but nevertheless with practical sizes and weights of the flywheels this oscillation is, to a certain extent, transmitted to the flywheel which is caused to oscillate in a like manner but with less amplitude. When such engines are employed in motor vehicles, this oscillation of the flywheel is transmitted to the clutch and from the clutch to the transmission and has the tendency to cause the gears in the transmission to intermittently overrun each other which, due to the necessary clearance provided between the matching teeth, sets up an undesirable clatter and vibration of the transmission. The present invention provides a means whereby such oscillations may be dampened out of the system before it reaches the transmission, thereby eliminating the disadvantages explained which would otherwise be present. The point in the system which I employ for this purpose is at the clutch driven member, or clutch driven plate as it is commonly called, and I so form this member that one portion thereof is yieldably secured to another portion whereby the torsional oscillations transmitted to one portion will be taken up by the yieldable means and a substantially non-oscillating motion will be transmitted to the other portion and to the transmission.

In the drawings I show in Figure 1 a clutch which, except for the present invention, is of conventional construction, and is built into the cored out rear face of the engine flywheel 15 which is secured by bolts 16 to the rear end of the engine crank shaft 17. A ringlike plate 18 is secured to the rear edge of the flywheel rim portion by screws 19, and the outer portion of the clutch driven member, which embodies the present invention, is clamped against the forward face thereof by the pressure ring 20 which is urged toward the plate 18 by a plurality of coil springs 21 held under compression between the ring 20 and the cups 22 in which they seat. The clutch driven member is supported at its center for axial movement on the clutch driven shaft 23 which is supported at its forward end by the bearing 24 carried by the rear end of the engine crank shaft 17, and is splined to the shaft 23 to prevent relative rotation in respect thereto. Radially extending clutch levers 25 pivoted on the plate 18 at 26 terminate adjacent the shaft 23 and are provided adjacent their outer ends with adjustable screws 27 which bear against the outer ends of the pins 28 which slidably project through the plate 18 and are secured to the pressure ring 20. When the clutch pedal (not shown) is pressed forward, the clutch throw-out collar 29 is caused to move forward on the sleeve 31 surrounding the shaft 23 and the bearing 30 carried by the forward face of the collar 29 contacts with and causes the inner ends of the levers 25 to be carried forward with it, the screws 27 applying the pressure to the pins 28 which move forwardly and cause the pressure ring 20 to recede from the plate 18 and free the clutch driven member from clamped relation with the plate 18. Upon release of pressure on the clutch pedal, the springs 21 cause the parts to resume their normal position as shown.

The clutch driven member shown in Figures 1, 2 and 3 comprises two main portions, an outer ring portion 32 and an inner portion 33 yieldably secured together as will hereinafter be described, and forming in combination a centrally apertured disc serving the same purpose as the conventional clutch driven disc. The inner portion 33 is secured by rivets 34 to a hub 35 the bore of which is splined to slidably but non-rotatably engage the shaft 23. The diameter of the inner edge of the ring 32 is slightly larger than the outer diameter of the portion 33 which fits therein and lies in the same general plane, and the adjacent edges are flanged outwardly and are provided at spaced points thereon with matching semi-cylindrical depressions 36 co-acting to form a series of cylindrical openings in the adjacent faces of the portions 32 and 33. Within each of these openings is received a cylindrical block 37 of rubber or other yieldable material which serves to transmit torque from one portion to the other. A bolt 38 passes through the center of each block 37 and receives a washer 39 on each side thereof, a nut 40 being provided for drawing the washers 39 up on each bolt 38 until they lie in contacting or nearly contacting and sliding relation with each face of each portion 32 and 33. The blocks 37 are preferably made of a length normally greater than the depth of each opening in which they are received so that when the washers 39 are drawn up as described the block 37 will be compressed, causing a tendency to increase in diameter and completely filling the opening, and tending to hold the adjacent portions 32 and 33 in spaced relation so that when relative rotational movement of the portions 32 and 33 occurs there will be no rubbing of the adjacent metallic edges which might cause a squeak. The washers 39, overlapping the sides of the portions 32 and 33 as they do, hold the portions 32 and 33 against axial displacement relative to each other. As in conventional constructions, rings 41 formed from suitable friction material are provided for the outer portion of both faces of the member 32 in order to prevent slippage between the same and the plate 18 and ring 20.

From the foregoing description it will be seen that the clutch driven member is so constructed that the outer portion is yieldably connected to the inner portion 33 by the blocks 37 which insulate one portion from the other. When the flywheel oscillates torsionally the blocks 37 yield sufficiently to absorb the oscillations and a substantially uniform and non-oscillating motion is transmitted to the inner portion 33 and thence through the shaft 23 to the transmission. At the same time any metallic sound in the motor which is transmitted to the flywheel is prevented from reaching the transmission by the blocks 37.

In Figures 4 and 5 a slightly modified construction is shown. Instead of providing depressions in both of the adjacent faces of the portions 32 and 33 such as the depressions 36 in the previously explained views, depressions 42 rectangular in section are provided in the outer edge of the inner portion 33 only, and tongues 45 are formed on the inner edge of the outer portion 32 and project radially inwardly therefrom centrally of each depression 42 to a point adjacent but spaced from the bottom of the depression 42. A U-shaped block 44 of yieldable material such as rubber fits around the sides and inner end of each tongue 45 and completely fills the space therebetween and the sides of the depression 42, bolts 38 passing through the end of each tongue 45, washers 39 and nuts 40 being provided as in the previously described construction for holding the blocks 44 in position and preventing relative axial displacement of the portions 32 and 33. In this construction the blocks 44 are in compression only when transmitting torque from one portion 32 or 33 to the other, and no shearing stress whatever is applied thereto.

In Figures 6 and 7 another variation is shown quite similar to that shown in Figures 1, 2 and 3, but provided with V-shaped depressions 45' in the adjacent edges of the portions 32 and 33 which match up to form rectangular openings, the walls of the depressions 45' being perpendicular to the faces of the members 32 and 33. The openings are so placed in relation to the direction of torque transmitted that the yieldable blocks 46 which fill the same are compressed in the direction of their longest sides when torque is being transmitted thereby. This construction will allow slightly greater relative motion between the portions 32 and 33 and the blocks 46 are subjected primarily to a compressive stress in transmitting power from one porton 32 or 33 to the other, rather than to a shearing stress. This modification also illustrates a positive means for accurately spacing the adjacent edges of the portions 32 and 33 from each other so that such edges may not come into rubbing engagement which might result in squeaking. This means, as best shown in Figure 7, comprises forming a peripheral groove 47 in the outer edge of the inner portion 33, and inserting in such groove between the blocks 46, strips 48 of compressed graphite impregnated fabric or other material which has dry lubricating properties. The strips 48 project past the outer edge of the inner portion 33 an amount equal to the clearance allowed between the adjacent edges of the portions 32 and 33, so that the outer portion 32 bears against and is guided in a radial direction on the outer faces of the strips 48. Because of the nature of the material from which the strips 48 are made, the movement of the outer portion 32 thereon has no tendency to cause squeaking.

Formal changes may be made in the specific embodiment of the invention described without departing from the spirit and substance of the broad invention, the scope of which is commensurate with the appended claims.

What I claim is:—

1. A clutch driven member comprising an outer part adapted to be frictionally secured to an engaging part and a co-planar and concentric inner portion adapted to be slidably but relatively non-rotatably supported on a shaft, the inner edge of said outer portion lying adjacent but outside of the outer edge of said inner portion, depressions in said edges matching to form openings, resilient blocks in said openings, and means for preventing relative axial displacement of one of said portions in respect to the other of said portions.

2. A clutch driven member comprising an outer portion having a generally circular inner edge and an inner portion having a generally circular outer edge lying inwardly of and adjacent to said inner edge, resilient blocks interposed between said edges to effect a cushioned drive between said portions, and means slidably engaging said portions for preventing axial displacement of one of said portions relative to the other thereof.

3. A clutch driven member comprising an outer portion having a generally circular inner edge and an inner portion having a generally circular outer edge lying inwardly of and adjacent to said inner edge, depressions in said edges matching to form openings, resilient blocks in said openings, a bolt carried by each of said blocks, and washers carried by said bolt slidably engaging the sides of said portions whereby to prevent axial movement of one of said portions relative to the other of said portions.

4. A clutch driven member comprising an outer portion having a generally circular inner edge and an inner portion having a generally circular outer edge lying inwardly of and adjacent the said inner edge, depressions in said edges matching to form openings, resilient blocks carried by said openings, and means for compressing said resilient blocks in a direction perpendicular to the plane of said portions.

5. A clutch driven member comprising an outer portion and an inner portion having adjacent generally circular spaced edges, depressions in said edges matching to form openings positioned diagonally of the edges in which they are formed, resilient blocks carried by said openings for locking said portions together, and means for expanding said blocks to cause the same to completely fill said openings and hold said portions in spaced relationship to each other.

6. A clutch driven member comprising an outer portion and an inner portion having generally circular adjacent edges lying in the same plane, depressions in said edges matching to form openings having their greatest dimension substantially in the line of said edges, and resilient blocks secured in said openings.

7. A clutch driven member comprising an outer portion and an inner portion lying in substantially the same plane and having generally circular edges lying in adjacent relationship, depressions in said edges matching to form elongated openings positioned diagonally of the edges in which they are formed, and resilient blocks secured in said openings.

8. A clutch driven member comprising an outer portion and an inner portion lying in substantially the same plane and having generally circular edges lying in adjacent relationship, depressions in said edges matching to form openings, and resilient blocks filling said openings, said openings being of greater length than breadth and having their greatest dimension lying substantially in the line of said edges and having their shortest dimension positioned in a generally radial direction whereby said blocks will be subjected primarily to compression when force is transmitted from one of said portions to the other of said portions.

9. A clutch driven member comprising an inner portion and an outer portion lying in substantially the same plane and having generally circular edges lying in spaced and adjacent relationship, depressions in said edges matching to form openings, resilient blocks carried by said openings, and means for holding said edges in spaced relationship.

10. A clutch driven member comprising an outer portion and an inner portion lying in substantially the same plane and having adjacent spaced edges, depressions in said edges matching to form openings, resilient blocks carried by said openings, and means for holding said edges in spaced relationship comprising bearing members carried by one of said edges.

11. A clutch driven member comprising an outer portion and an inner portion lying in substnatially the same plane and having generally circular adjacent edges, depressions in said edges matching to form openings, resilient blocks carried by said openings, and means for holding said edges in spaced relationship comprising strips of material having dry lubricating properties carried by grooves in one of said edges in abutting relationship with the other of said edges.

Signed by me at Detroit, Michigan, this 25th day of October, 1926.

VINCENT LINK.